Figure 6:
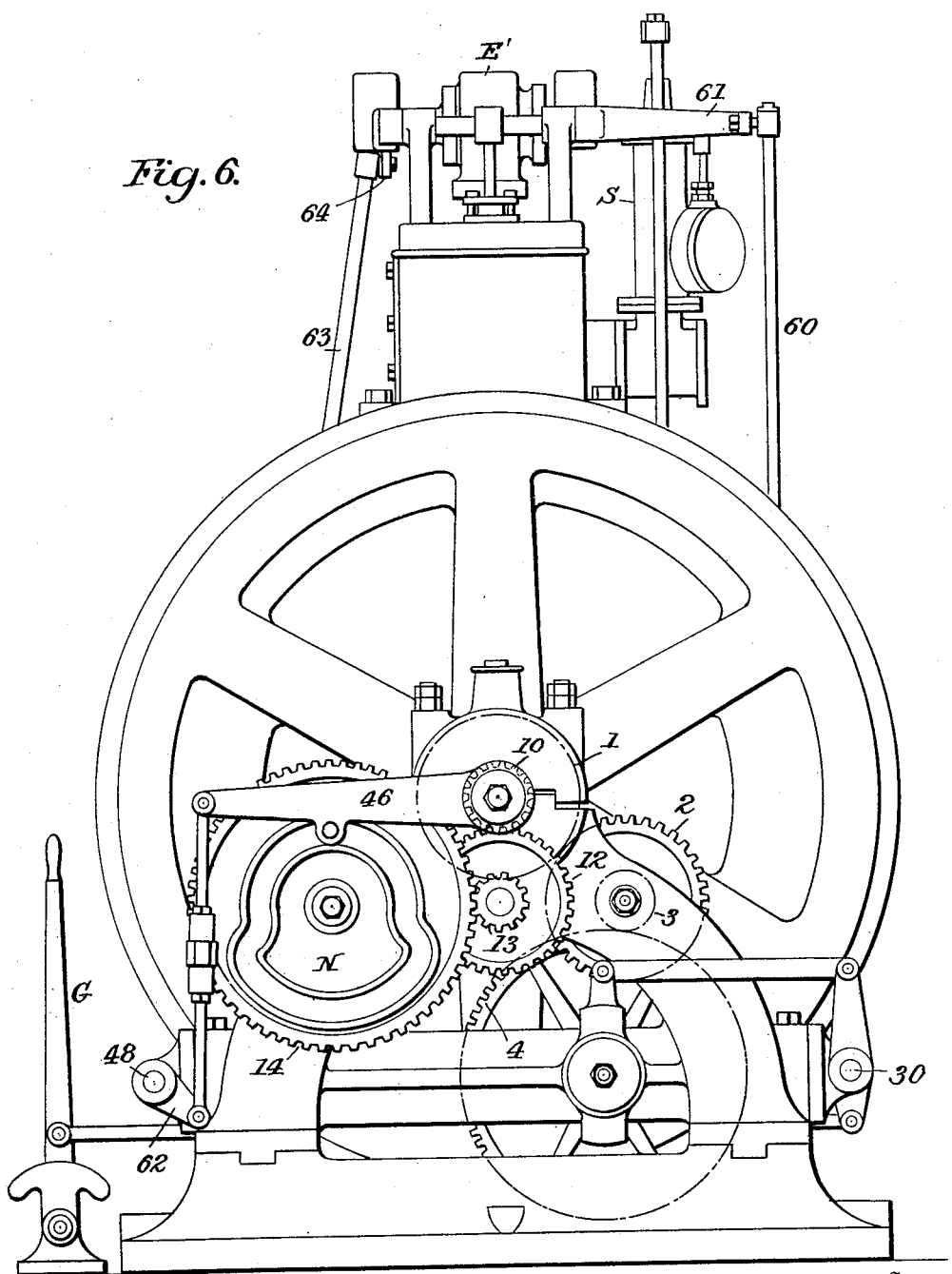

No. 704,271. Patented July 8, 1902.
G. H. REYNOLDS.
CONTROL DEVICE FOR HOISTING MACHINES.
(Application filed Dec. 29, 1898.)
(No Model.) 6 Sheets—Sheet 1.
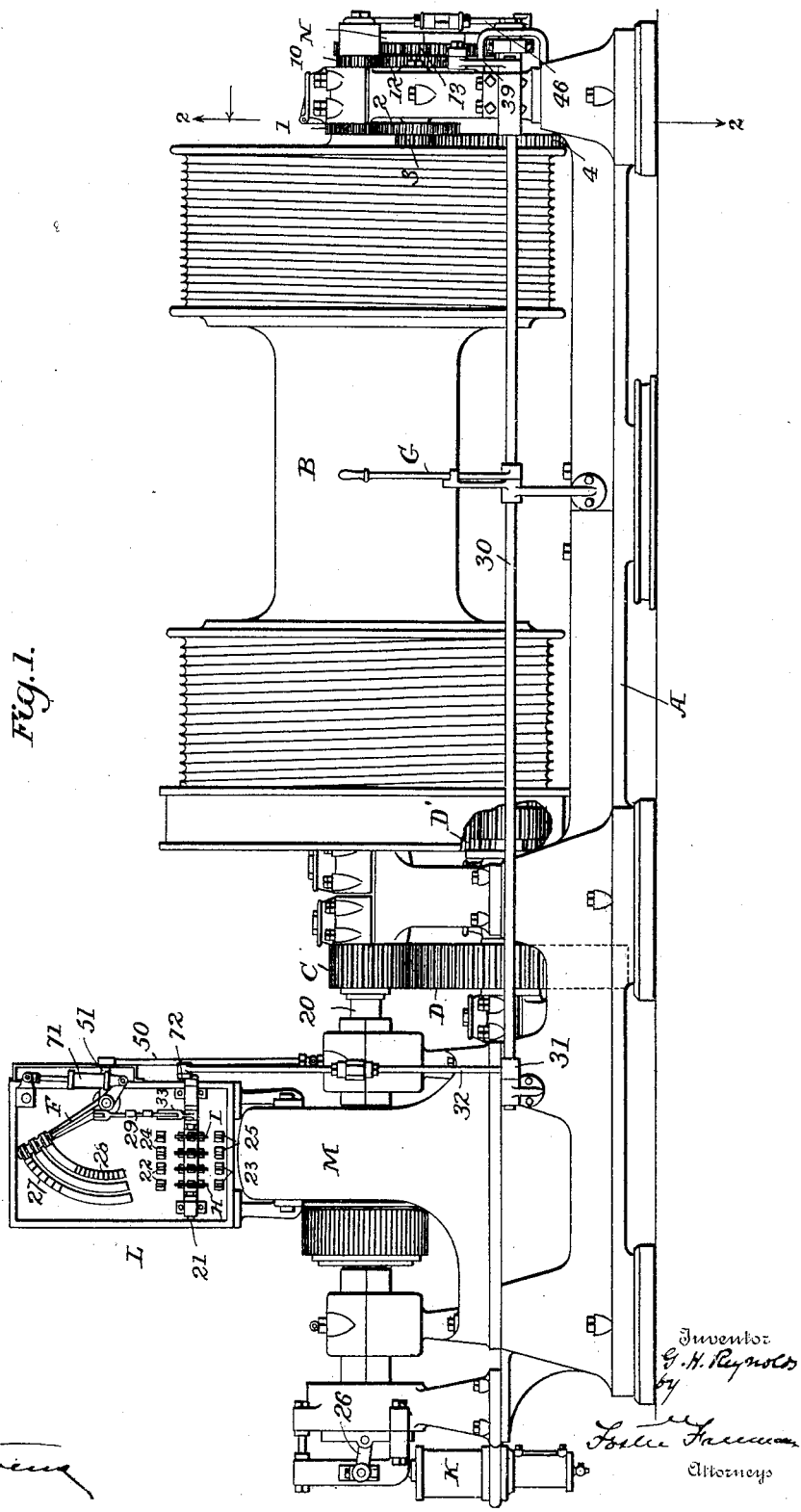

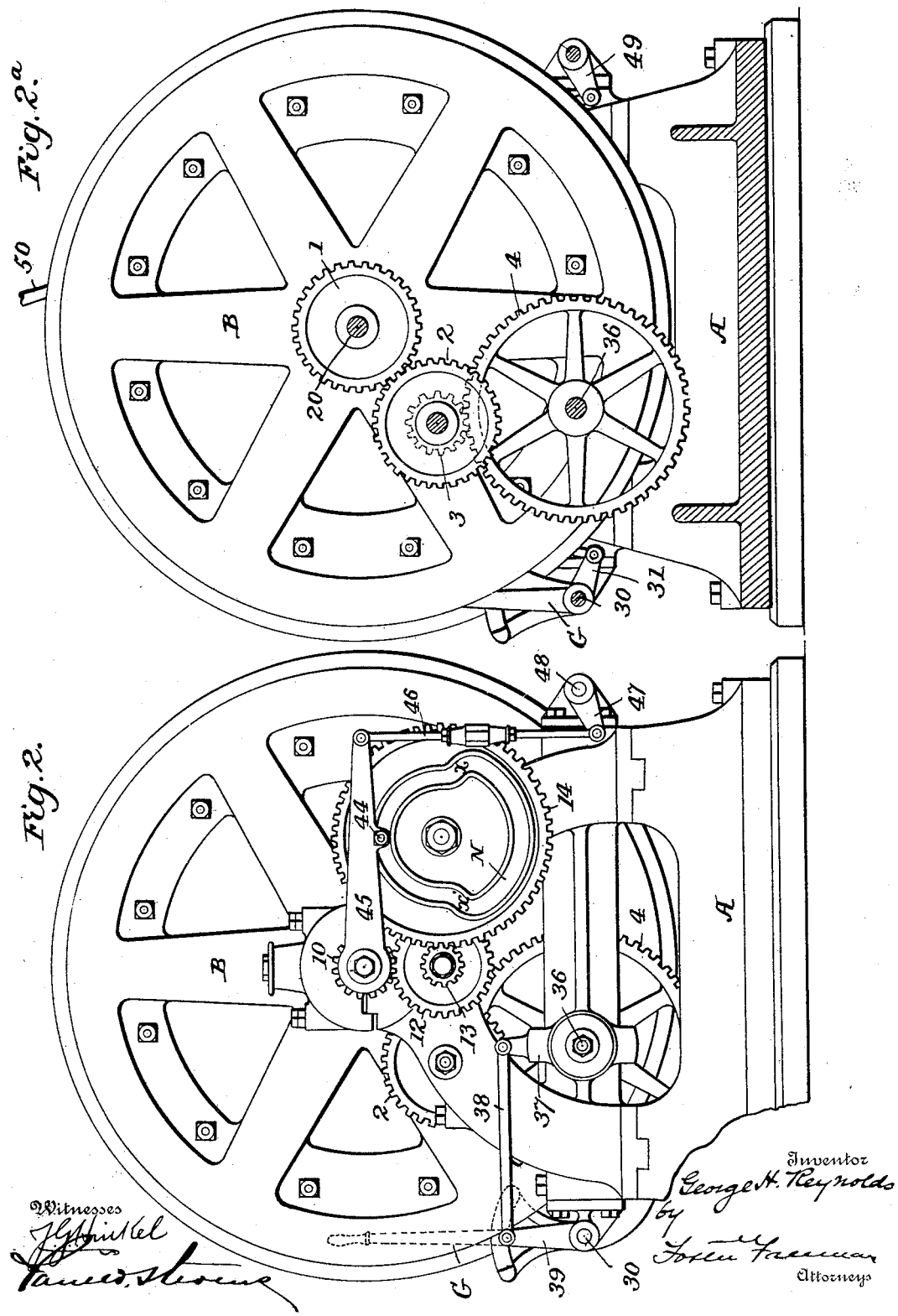

No. 704,271. Patented July 8, 1902.
G. H. REYNOLDS.
CONTROL DEVICE FOR HOISTING MACHINES.
(Application filed Dec. 29, 1898.)
(No Model.) 6 Sheets—Sheet 3.
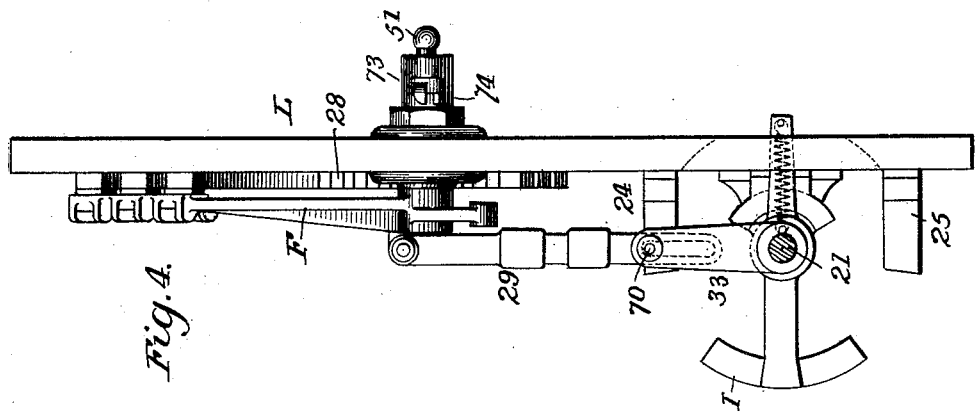
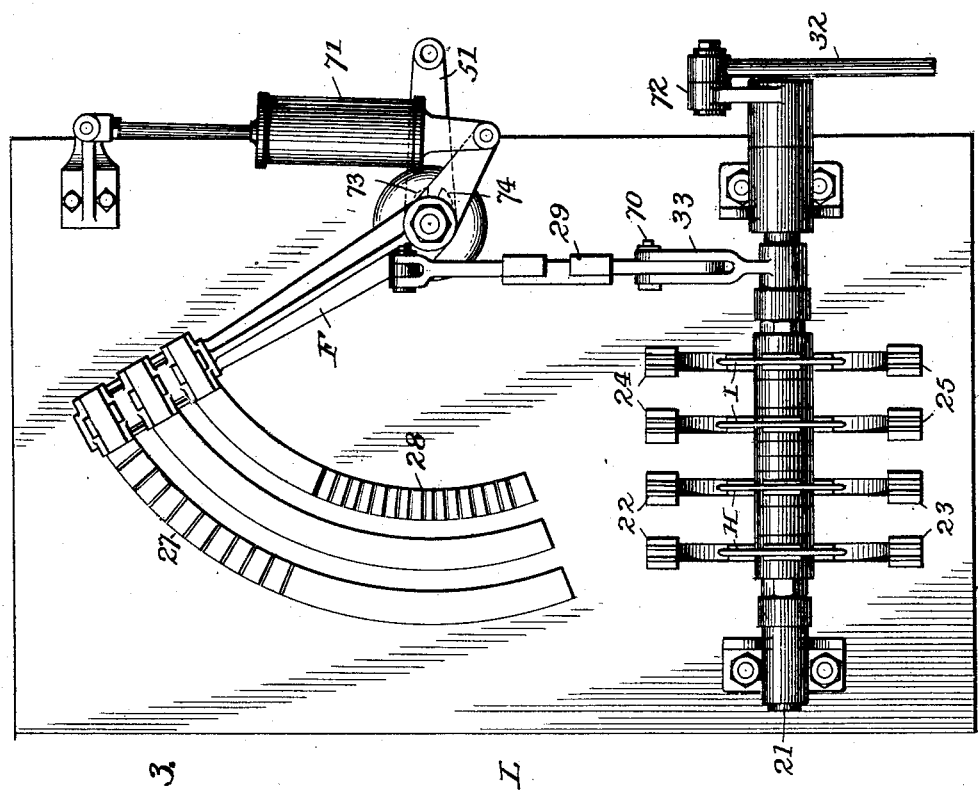

No. 704,271. Patented July 8, 1902.
G. H. REYNOLDS.
CONTROL DEVICE FOR HOISTING MACHINES.
(Application filed Dec. 29, 1898.)
(No Model.) 6 Sheets—Sheet 4.
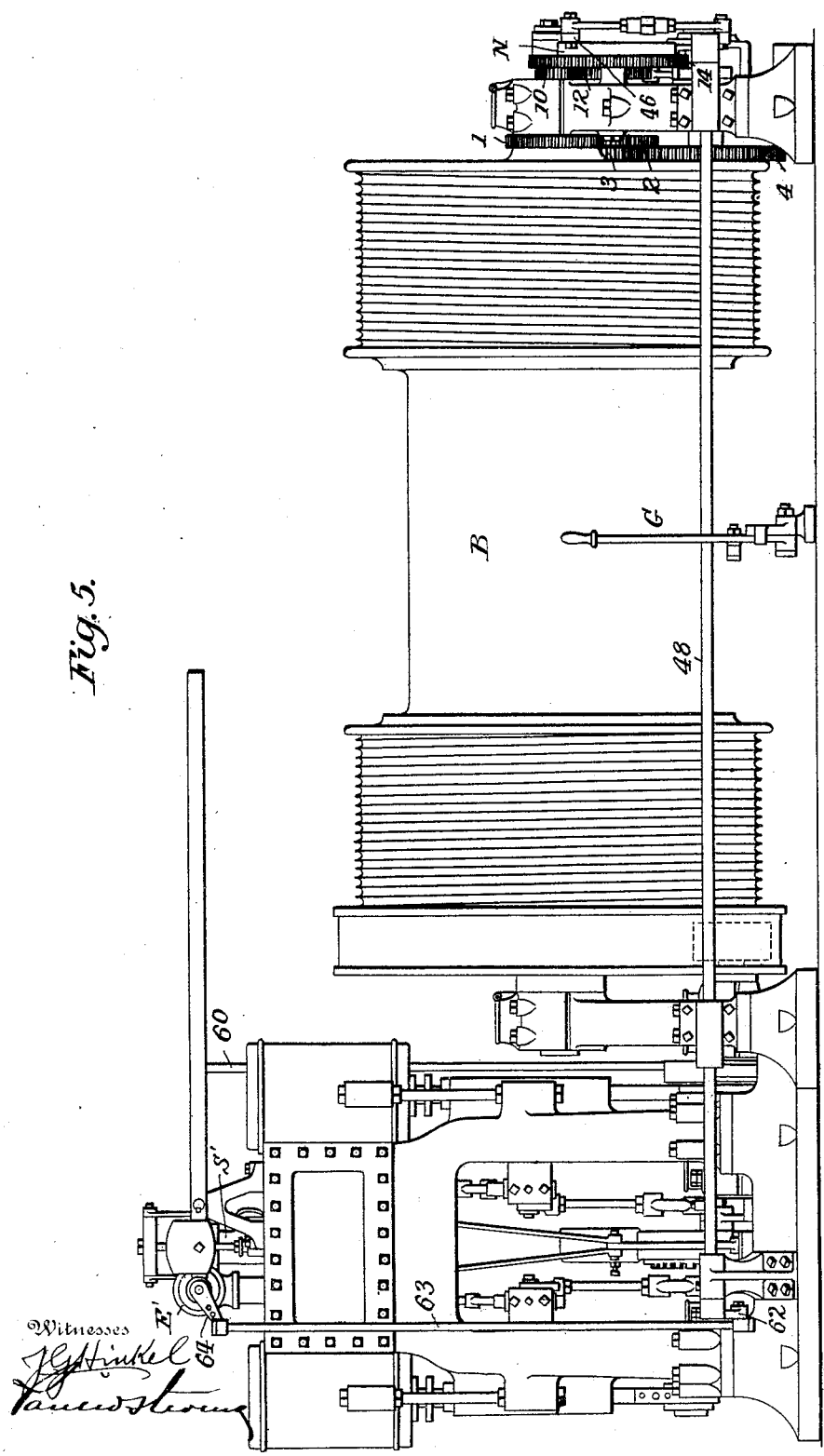

No. 704,271. Patented July 8, 1902.
G. H. REYNOLDS.
CONTROL DEVICE FOR HOISTING MACHINES.
(Application filed Dec. 29, 1898.)

(No Model.) 6 Sheets—Sheet 5.

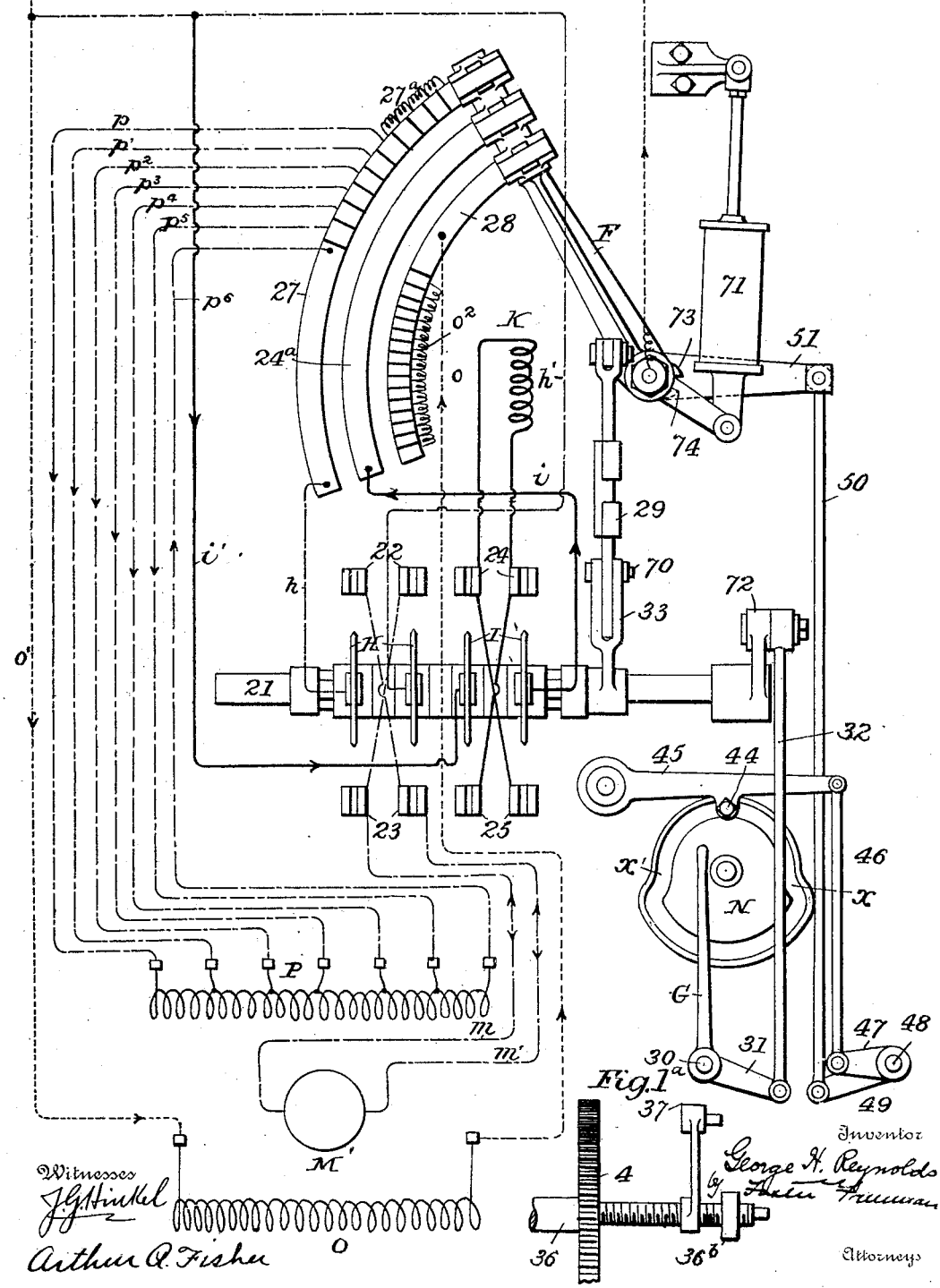

UNITED STATES PATENT OFFICE.

GEORGE H. REYNOLDS, OF CHICAGO, ILLINOIS, ASSIGNOR TO THE OTIS ELEVATOR COMPANY, OF EAST ORANGE, NEW JERSEY, A CORPORATION OF NEW JERSEY.

CONTROL DEVICE FOR HOISTING-MACHINES.

SPECIFICATION forming part of Letters Patent No. 704,271, dated July 8, 1902.

Application filed December 29, 1898. Serial No. 700,637. (No model.)

*To all whom it may concern:*

Be it known that I, GEORGE H. REYNOLDS, a citizen of the United States, residing at Chicago, in the county of Cook and State of Illinois, have invented certain new and useful Improvements in Control Devices for Hoisting-Machines, of which the following is a specification.

My invention relates to elevators or hoists, and has for its object to improve the construction and arrangement of such devices, and more particularly to provide means for controlling the motor device, whereby the motor can be started and stopped manually and can be stopped automatically, and, further, to provide devices whereby the speed of the motor is automatically regulated; and to these ends my invention consists in the various features of construction and arrangement of parts adapted to operate substantially in the manner hereinafter more particularly set forth.

In the accompanying drawings, Figure 1 is a side view of an electrical hoisting apparatus embodying my invention. Fig. 1ª is a view showing parts of the usual automatic stop devices detached. Fig. 2 is an end view. Fig. 2ª is a section on the line 2 2, Fig. 1. Fig. 3 is an enlarged front view of the switchboard and its adjuncts. Fig. 4 is a side view of the same. Fig. 5 is a side elevation of the steam apparatus embodying my invention. Fig. 6 is an end view thereof, and Fig. 7 is a diagrammatic representation of the circuits.

In the operation of elevators and hoists of different kinds and for different purposes it is common to provide the engine or motor with some sort of control device for starting and stopping the same which serves to let on and cut off the motor fluid, and this is adapted to be controlled by the operator. It is further common to provide additional control devices in the form of what is generally known as "automatic stop devices" for stopping the motor as the elevator or hoist reaches the limits of its movement in either direction, so that if, perchance, the operator fails to stop the engine at the proper time it will be automatically stopped. It is further desirable, especially in the use of elevators or hoists which travel at a rapid rate, to provide regulating devices controlling the speed, which especially shall operate to gradually reduce the speed of the motor before it is finally stopped, and as a refinement of this it is often desirable to control the starting of the motor so that it can attain a certain relative speed by the use of the ordinary starting and stopping devices and then can further attain a higher speed, which is the maximum, and it is often desirable that this regulation shall be automatic and controlled by some moving part of the apparatus and beyond the control of the operator. By my present invention I provide means whereby these objects can be attained, and more especially whereby the speed of the motor shall automatically be controlled, so as to slow down or reduce the speed of the motor before it is finally stopped, and also preferably to automatically limit the speed of the motor so that it cannot attain its maximum speed until after a certain time or a certain movement of the motor and its attached elevator or hoist has been accomplished.

My invention may be carried out in connection with different motors using different motor fluids and different details of connection, and in order that the general principles of the invention can be understood I have shown and will describe herein its application to an electric motor and to a steam or other fluid motor.

I will first describe the electrical apparatus. (Illustrated more particularly in Figs. 1 to 4 and shown diagrammatically in Fig. 7.) Upon a base A are suitable bearings supporting the shaft of the drum B, driven through gears C D D' from the armature-shaft 20 of the motor M, adjacent to which is a switchboard L. This switchboard carries a control device of suitable character, and I have shown as mounted in bearings thereon a shaft 21, carrying pairs of switch blades or arms H I, which are adapted to coöperate with the proper terminals to constitute circuit-breakers. Arranged adjacent this shaft 21 are the armature-terminals 22 and 23, arranged to coöperate with the pair of blades H and to control the direction of the current through the armature, according to the direction in which the blades H are rocked. Also arranged adjacent the shaft 21 are the pairs of terminals 24 25, adapted to coöperate with the pair of blades I and to control the circuit of the magnet K, which is arranged to operate the brake-arm 26, it being understood that normally this brake is applied to the shaft; but when the magnet K is energized the brake-arm is lifted and the brake released. Of course it is immaterial in what direction the current passes through the brake-magnet, and other terminals may be arranged in a manner well understood which shall energize the brake-magnet when a proper current is passing through the motor and allow the brake to be applied and remain applied under other conditions.

Of course various arrangements of circuits may be provided for operating the motor and controlling its starting and stopping, and in the present instance I have shown a compound-wound motor in which the series field-magnet coils are in sections and connected in series with the armature resistance, and there is also provided a series of resistance-coils adapted to be included in the shunt field-magnet coil, and these are arranged to be controlled by a single moving switch-arm. Thus in the drawings, Figs. 3, 4, and 7, I have shown a switch-arm F suitably pivoted and in the present instance provided with a speed-controller in the shape of a dash-pot 71, which regulates its downward movement under the force of gravity. For moving the switch-arm upward there is connected thereto a link 29, having a slot in its lower end in which moves a pin 70, mounted in an arm 33 on the shaft 21, and it will be seen that the construction and arrangement are such that when the shaft is in its normal position the switch-arm F is held in its uppermost position; but when the shaft 21 is rocked in either direction the pin 70 moves through the slot in the link 29 without affecting the arm F, but freeing it, so that it can descend by gravity under the control of the dash-pot. Thus in starting the motor the switch-arm F is free to move under gravity and is controlled by the dash-pot or similar device; but when the shaft 21 is moved to break the circuit of the motor the switch-arm F is positively moved to its normal or uppermost position. In the present instance this switch-arm, which is connected in the main circuit, is adapted to move over three segments, one of which, 27, controls the series field-magnet coils and the armature-circuit, another, 28, of which controls the shunt field-magnet, and the third, $24^a$, controls the brake-magnet circuit. The segment 27 is provided with a number of contacts connected by resistance-coils $27^a$ and another set of contacts controlling the sections of the series field-magnet coils P through the circuits $p\ p'\ p^2\ p^3\ p^4\ p^5\ p^6$, and the end of the segment is connected by a conductor $h$ with one of the pair of blades H, while the other blade H is connected by a conductor $h'$ with the main line. The armature M' of the motor is provided with the usual brushes connected by conductors $m\ m'$ with the terminals 23, and these in turn are connected by the cross-circuits in the usual way to the terminals 22.

The segment $24^a$ is connected by the conductor $i$ with one of the pair of blades I, and the other blade of the pair is connected by conductor $i'$ to the main line, while the magnet K is connected to the terminals 24, and these in turn are connected to the terminals 25, so that whichever set of terminals is closed by the pair of blades the magnet K is energized.

The segment 28 is connected by a conductor $o$ with the shunt field-magnet coil O, and this is connected also by a conductor $o'$ with the main line, and on the segment are a series of contacts connected by resistances $o^2$, so that more or less of such resistances may be included in the shunt-magnet circuit, as hereinafter explained.

The starting and stopping or control device of the elevator or hoist is arranged so as to be operated by the operator, who, especially in the case of hoists, should be stationed near the winding-drum. I therefore provide connections between the hand operating-lever G and the shaft 21 whereby the latter can be turned in either direction to start or stop the motor to raise or lower the load or to arrest its movement at any desired point. As shown, there is a shaft 30, mounted on the base A, having an arm 31, connected by a rod 32 with an arm 72 on the shaft 21, so that by manipulating the lever G the shaft 21 can be rocked in either direction to close the circuits of the switch, and it is proper to remark at this point that this switch may be constructed in any desired manner, but preferably so as to operate as a snap-switch to quickly make and break the circuit in a manner well understood.

Further, as above indicated, I provide automatic means for operating the switch-shaft 21 as the elevator or hoist approaches the limits of its travel in either direction, so that if perchance the operator fails to stop the motor at the proper time it will be automatically stopped, and I utilize the ordinary and well-known automatic stop-motion for this purpose adapted to operate the shaft 30. Thus I attach to the drum-shaft a pinion 1, Fig. $2^a$, which is part of a chain of gears 1 2 3 4, which latter is upon a shaft 36, the end of which is threaded and extends through a threaded hub on the arm 37, connected by a rod 38 with an arm 39 on the shaft 30. On the end of the shaft 36 is a nut $36^b$, Fig. $1^a$, and, as is well understood, in the usual operation of the elevator the arm 37 travels on the screw-threaded portion of the shaft 36 back and forth as the elevator rises or lowers; but when the elevator approaches the limit of its motion in either direction the arm impinges upon the face of the gear-wheel 4 or the face of the nut 36$^b$, as the case may be, and is rocked by the shaft and in turn through the medium of the rod 38 and arm 39 rocks the shaft 30 and through its connection the switch-shaft 21 to automatically break the circuit.

As thus far described the switch-shaft can be controlled by the operator at any time to make or break the circuit, and it is automatically controlled by the automatic stop device to break the circuit as the car approaches the end of its movement, and so far as these operations broadly are concerned they are common in this class of apparatus.

As above intimated, it is desirable to provide means for regulating the speed of the motor automatically, so as to cause it to slow down or reduce its speed before it is finally stopped, and it is also sometimes desirable to prevent the motor attaining its full speed too quickly, and the regulating devices I am about to describe automatically accomplish both of these objects, although, of course, it is evident that it can be arranged to accomplish only the slowing effect.

Mounted on the frame of the machine is a suitable cam N, and this in the present instance is connected to be driven by a chain of gears 10 12 13 14 from the drum-shaft, so that the movement of the cam corresponds to the movement of the elevator or hoist. This cam in the present instance is provided with a cam-groove of suitable shape, depending upon the extent of movement of the elevator or hoist. Suitable connections are provided between the cam and the switch-arm F whereby the movements of the latter can be automatically controlled through the movements of the cam, and in the present instance I have shown a pin 44 on the lever 45 engaging the cam-groove, and this lever is connected by the rod 46 with an arm 47 on the rock-shaft 48, on which is mounted an arm 49, connected by a rod 50 with an arm 51, swinging on the pivot of the switch-arm F. This arm 51 is provided with a stop device, such as a lug 73, and a similar stop device, such as a lug 74, is connected with the switch-arm. The shape of the cam is such that when the motor is at rest the parts are in the position shown in Fig. 7, in which it will be seen that the switch-arm F is free to move under gravity to a certain extent when released by the pin 70, working in the slot of the link 29; but when the cam is moved a certain distance the offsets $x$ $x'$ tend to lift the pin 44 and through its connections the arm 51, so that the lug 73 is raised, permitting the switch-arm F to fall to its fullest extent. So, also, when the cam moving in the other direction draws down the pin 44 the arm 51 is also drawn down to the position shown in Fig. 7, and if perchance the switch-arm F is down it will be forcibly lifted a portion of its height.

With this general description the operation of the apparatus will be largely understood by those skilled in the art; but to more fully set it forth I will assume the parts to be in the positions shown in Fig. 7, with the motor at rest and the brake applied. The operator moves the hand operating-lever G, rocking shaft 30 in one or the other direction, according to the direction of movement of the elevator or hoist, and through the arm 31, rod 32, and arm 72 rocks the shaft 21 to bring the blades H or I in contact with the proper terminals, and we will assume that they are brought in contact with the terminals 22 and 24. In doing this the pin 70 has moved in the slot of the link 29, so as to release the switch-arm F, which now falls by gravity controlled by the dash-pot. The circuits are such that the current entering at + may be traced through the conductor $h'$, one of the blades H, one of the terminals 22 to one of the terminals 23, through the conductor $m$, armature M′, conductor $m'$ to the other terminal 23, thence to the other terminal 22, to the blade H, conductor $h$, and segment 27, thence through the conductor $p^6$, the series field-magnet coils P, conductor $p$, resistances 27$^a$, switch-arm F to the − line. At the same time the current from the + main-line terminal passes through the conductor $i'$, one of the blades I, one of the terminals 24, through magnet K, the other terminal 24, the other blade I, conductor $i$ to the segment 24$^a$, the switch-arm F, and to the − main-line terminal; so, also, from the + main-line terminal current flows through the conductor $o'$, shunt field-magnet coil O, conductor $o$, segment 28, switch-arm F to the − line, and the motor starts. As the switch-arm F falls the resistance 27$^a$ is gradually cut out and successively more or less of the series field-magnet coils P until the switch-arm reaches the position about midway, when the lug 74 impinges on the lug 73, and the movement of the switch-arm F is arrested. The motor having thus started under proper armature-resistance and the series field-magnet coils having been progressively cut out attains a certain speed, and meanwhile the cam N has rotated in connection with the drum until one of the offsets $x$ or $x'$ raises the pin 44 which through its connecting mechanism lifts the arm 51 and its lug 73, allowing the switch-arm F a further downward movement, and this gradually cuts in the resistance-coils $o^2$ into the circuit of the shunt field-magnet coil O, allowing the motor to attain its full speed. Of course at any point of its movement the motor can be stopped by the operator through the medium of the hand operating-lever G, breaking the circuit and applying the brake, and if perchance the operator fails to stop the motor in the proper time the automatic stop mechanism through the arm 37 will operate the shaft 30 to break the circuit and stop the motor. Previous to this, however, in order to slow down the movement of the motor the regulating devices before described come into operation, and the cam N reaches such a point that one of its offsets $x$ or $x'$ draws down the pin 44, which through its connecting mechanism draws down the arm 51, and this through its lug 73 and the lug 74 forcibly raises the switch-arm F to positively cut out the shunt field-magnet resistance $o^2$ and, if desired, include more or less of the series field-magnet coils P in the circuit, causing the speed of the motor to fall, and then the automatic stop mechanism being properly adjusted will break the circuit, applying the brake and stopping the motor when the elevator reaches its proper position.

It will thus be seen that I provide automatic regulating means for reducing the speed of the motor before it is stopped at the end of the travel of the elevator or hoist, and I also as a further refinement in the present instance prevent the too rapid starting of the motor until the elevator or hoist has moved a certain distance by the automatic devices described. It will further be seen that this automatic regulating device is independent of the movement of the hand operating device for starting or stopping the motor and only operates at or near the beginning or ending of the movement of the elevator or hoist and is more particularly applicable for use in connection with hoists intended to move a certain definite distance up or down, the shape and movements of the cam of course being adjusted to comform to the distance traveled by the hoist.

To show the scope of my invention and its application to a hoisting-engine driven by a steam or similar motor, reference is made to the construction shown in Figs. 5 and 6, whereby a similar operation of the automatic regulator can be accomplished by mechanical means. In this case the flow of steam or other fluid to the motor-engine is controlled by a valve S', while an auxiliary valve E' serves, when shifted, to gradually cut off or let in the flow of motor fluid. In this instance the auxiliary or control valve E' is shifted by the hand operating-lever G, connected to the rock-shaft 30, which through the connecting-rod 60 extends to the valve-operating lever 61. The auxiliary or slow-down valve E' is operated from the cam N by suitable connections, as before, with the rock-shaft 48, to which is connected the arm 64 through the medium of the rod 63, which arm is on the spindle of the valve E' and automatically moves the same to gradually reduce the flow of the motor fluid, and then the valve S' is operated, cutting off the flow entirely.

It will thus be seen that my invention can be applied in many and various forms, accomplishing the same general purposes and results, and without limiting myself to the precise construction and arrangement of parts hereinfore described

What I claim is—

1. In a hoisting apparatus, the combination with control devices for starting and stopping the engine, of automatic regulating devices connected to some moving part of the apparatus for reducing the speed of the engine before the hoist reaches the limits of its movement, substantially as described.

2. In a hoisting apparatus, the combination with the control devices for starting and stopping the engine, of an automatic stop device for stopping the engine as the hoist reaches the limits of its movement, and automatic regulating devices connected to some moving part of the apparatus for reducing the speed of the engine before the hoist reaches the limits of its movement, substantially as described.

3. A hoisting-engine provided with a control device for cutting off and turning on the motor fluid, and connections operated by the engine for shifting said devices at the limits of travel of the cable, and with an auxiliary or speed-regulating device for gradually decreasing or increasing the flow of said fluid, and means for shifting the regulating device to retard said flow prior to the operation of the control device, substantially as set forth.

4. A hoisting-engine provided with a motor and its control and regulating devices, a winding-drum, two shifting devices, and means for operating the same, one connected with the control device and the other with the regulating device of the motor, substantially as set forth.

5. The combination of a hoisting-engine, motor, motor control and regulating devices, and two shifting devices connected to be moved by operating parts of the apparatus and respectively connected to operate the control and regulating devices, substantially as set forth.

6. The combination with a hoisting drum and motor, of two shifting devices connected to independently control the operation of the motor, and means for operating the shifting devices in succession, substantially as set forth.

7. The combination with a hoisting drum and motor, of two shifting devices connected to independently control the operation of the motor, and means for operating the shifting devices in succession as the drum terminates its travel in either direction, substantially as set forth.

8. The combination of a hoisting-drum, two shifting devices, and a train of gears between each shifting device and the drum, substantially as set forth.

9. The combination of a hoisting-drum, drum-shaft, a shifting-cam N and shifting-lever 37, and a train of gears between each shifting device and the drum-shaft arranged to successively operate the same as the drum completes a predetermined travel in either direction, substantially as set forth.

10. The combination of a motor provided with control and regulating devices and a winding-drum provided with a shifting-cam and connections between the latter and the regulating device, and a shifting-lever and connections between the same and the control device, substantially as set forth.

11. In a hoisting mechanism, the combination of a car, mechanism for moving said car, means for stopping said car at the ends of its traverse and automatic means independent of the stopping means for changing the rate of movement of the car as it reaches certain predetermined points in its traverse substantially as set forth.

12. In a hoisting mechanism, the combination of a car, mechanism for moving said car, automatic means for changing the rate of movement of the car from slow to fast and from fast to slow as it reaches certain predetermined intermediate points in its traverse, and means for automatically stopping the car at the ends of its traverse, substantially as set forth.

13. In a hoisting mechanism, the combination of a car, a motor for moving said car, a connection from the motor to the generator, said connection being automatically controlled to effect a change of speed of the motor as the car reaches certain predetermined points in its traverse, and a normally operative connection from the generator to the motor, substantially as set forth.

14. In a hoisting mechanism, the combination of a car, mechanism for moving said car and automatic means for changing the rate of movement of the car from slow to fast and from fast to slow as it reaches certain predetermined intermediate points in its traverse, substantially as set forth.

15. A car, a hoisting-motor therefor, means for accelerating the speed of the motor as it starts up, and means operated by the motor for automatically arresting the car at any predetermined point.

16. A car, a hoisting-motor therefor, and means actuated by the motor for reducing the speed thereof as the car approaches any predetermined stopping-point.

17. In a hoisting mechanism, the combination of a car, mechanism for moving said car, an automatic brake, means for stopping the car at the ends of its traverse, and automatic means independent of the stopping means for changing the rate of movement of the car as it reaches certain predetermined points in its traverse, substantially as described.

18. In a hoisting mechanism, the combination of a car, mechanism for moving said car, an automatic brake which is held out of action by the motor fluid and is put into action by cutting off the motor fluid, means for stopping said car at the ends of its traverse, and automatic means for changing the rate of movement of the car, as it reaches certain predetermined points in its traverse, substantially as set forth.

19. In a hoisting mechanism, the combination of a car, mechanism for moving said car, means for stopping said car at the ends of its traverse, and automatic means independent of the stopping means for changing the rate of movement of the car, said automatic means being constantly connected to mechanism for moving said car, substantially as set forth.

In testimony whereof I have signed my name to this specification in the presence of two subscribing witnesses.

GEO. H. REYNOLDS.

Witnesses:
E. W. RUSSELL,
E. B. SOUTHWORTH.